US010332716B2

(12) United States Patent
Hosko et al.

(10) Patent No.: US 10,332,716 B2
(45) Date of Patent: Jun. 25, 2019

(54) CIRCUIT INTERRUPTER INCLUDING ELECTRONIC TRIP UNIT AND METHOD OF DETERMINING ELAPSED TIME OF START-UP PROCESS

(71) Applicant: EATON CORPORATION, Cleveland, OH (US)

(72) Inventors: Daniel A. Hosko, Pittsburgh, PA (US); Theodore J. Miller, Oakdale, PA (US); Zhi Gao, Warrendale, PA (US); Randy P. Shvach, Conway, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 233 days.

(21) Appl. No.: 15/405,513

(22) Filed: Jan. 13, 2017

(65) Prior Publication Data

US 2018/0204699 A1    Jul. 19, 2018

(51) Int. Cl.
*H02H 3/33* (2006.01)
*H01H 71/74* (2006.01)
(Continued)

(52) U.S. Cl.
CPC ............. *H01H 71/74* (2013.01); *G05B 15/02* (2013.01); *H02H 1/0092* (2013.01); *H02H 1/06* (2013.01); *H02H 3/006* (2013.01); *H02H 3/02* (2013.01); *H02H 3/05* (2013.01); *H02H 1/0015* (2013.01); *H02H 3/16* (2013.01); *H02H 3/33* (2013.01)

(58) Field of Classification Search
USPC ...................................................... 361/42–50
See application file for complete search history.

(56) References Cited

U.S. PATENT DOCUMENTS

2006/0072256 A1\* 4/2006 Miller .................. H02H 1/0015
361/42
2006/0181816 A1\* 8/2006 Pellon .................. G01R 31/025
361/5

(Continued)

FOREIGN PATENT DOCUMENTS

EP        2 254 214 A2    11/2010

OTHER PUBLICATIONS

Kiyoshi Yoshida et al: "Influence of Voltage on Arc Characteristics and Electrode Mass Change of AgNi Contacts for Electromagnetic Contactors", IEICE Transactions on Electronics, Institute of Electronics, Tokyo, JP, vol. E94C, No. 9, Sep. 1, 2011, pp. 1395-1401.

(Continued)

*Primary Examiner* — Danny Nguyen
(74) *Attorney, Agent, or Firm* — Eckert Seamans

(57) ABSTRACT

A circuit interrupter includes an electronic trip unit structured to receive power from a power supply. The electronic trip unit includes a start-up process and is structured to proceed through the start-up process when the electronic trip unit begins receiving power from the power supply and a timing circuit including a capacitor structured to begin charging when the electronic trip unit begins receiving power from the power supply. The electronic trip unit includes a processor that is structured to read a voltage across the capacitor when the start-up process has completed and to determine an elapsed time of the start-up process based on the read voltage across the capacitor.

19 Claims, 4 Drawing Sheets

(51) Int. Cl.
*H02H 1/00* (2006.01)
*H02H 3/02* (2006.01)
*H02H 1/06* (2006.01)
*H02H 3/05* (2006.01)
*G05B 15/02* (2006.01)
*H02H 3/00* (2006.01)
*H02H 3/16* (2006.01)

(56) References Cited

U.S. PATENT DOCUMENTS

2007/0297113 A1    12/2007  Domitrovich et al.
2008/0215278 A1*   9/2008   Colsch .................. H01H 69/01
                                                          702/85

OTHER PUBLICATIONS

European Patent Office, "International Search Report and Written Opinion" (corresp. to PCT/US2018/012725), dated May 14, 2018, 11 pp.

* cited by examiner

CIRCUIT INTERRUPTER INCLUDING ELECTRONIC TRIP UNIT AND METHOD OF DETERMINING ELAPSED TIME OF START-UP PROCESS

BACKGROUND

Field

The disclosed concept relates generally to circuit interrupters, and in particular, to circuit interrupters with an electronic trip unit.

Background Information

Circuit interrupters are typically used to protect electrical circuitry from damage due to a fault condition such as an arc fault or a ground fault. Circuit interrupters typically include separable contacts that separate to open the circuit the circuit interrupter is protecting. Some types of circuit interrupters includes an electronic trip unit (ETU).

An ETU receives inputs from one or more sensors that sense characteristics of the circuit (e.g., current, temperature, etc.). The ETU includes a processor that analyzes the inputs from the sensors to determine whether a fault condition is present. The ETU also determines if and when to output a trip signal in response to detecting a fault in order to cause the separable contacts to trip open. The ETU powers itself from the circuit it protects so when no power is flowing through the circuit interrupter, the ETU is inactive. When power begins flowing through the circuit interrupter, the ETU receives power and begins the process of detecting faults. However, each time the ETU turns on, the ETU must go through a start-up process that includes, for example, powering up, initializing, and running program code, before it is able to detect a fault and output a trip signal. The start-up process takes time. If a fault condition is present when the protected circuit is powered on, the time it takes the ETU to detect the fault will be delayed by the time it takes the ETU to proceed through the start-up process.

A trip curve for the circuit interrupter indicates the total time it takes the circuit interrupter to clear a fault. The trip curve has a tolerance associated with it that indicates the minimum and maximum amounts of time it can take the circuit interrupter to clear a fault. The time it takes the ETU to proceed through the start-up process results in a trip being delayed by an uncertain amount of time. The tolerance of the trip curve associated with the circuit interrupter must be increased in order to account for the uncertainty. Having a higher tolerance in trip curves for circuit interrupters can cause difficulties when designing power distribution systems and, in particular, in power distribution systems where circuit interrupters coordinate between each other. For example, some power distribution systems are designed such that the circuit interrupter closest to the fault will trip before any circuit interrupters upstream of it trip. Having a high tolerance in the trip curves makes it more difficult to coordinate between circuit interrupters because it is difficult to predict precisely when a circuit interrupter will clear a fault.

There is room for improvement in circuit interrupters.

There is also room for improvement in methods of controlling circuit interrupters.

SUMMARY

These needs and others are met by embodiments of the disclosed concept in which a circuit interrupter includes an electronic trip unit that determines the elapsed time of its start-up process. These needs and others are also met by embodiments of the disclosed concept in which a method includes determining the elapsed time of a start-up process of an electronic trip unit.

In accordance with aspects of the disclosed concept, a circuit interrupter electrically connected to a circuit comprises: separable contacts structured to open to interrupt current flowing through the circuit interrupter; an operating mechanism structured to trip open the separable contacts; a power supply structured to use power flowing through the circuit interrupter to provide power to components of the circuit interrupter; and an electronic trip unit structured to receive power from the power supply and including: a processor structured to detect faults in the circuit based on inputs from one or more sensors and to cause the operating mechanism to trip open the separable contacts in response to detecting a fault; and a timing circuit including a capacitor structured to begin charging when the electronic trip unit begins receiving power from the power supply, wherein the electronic trip unit includes a start-up process and is structured to proceed through the start-up process when the electronic trip unit begins receiving power from the power supply, and wherein the processor is structured to read a voltage across the capacitor when the start-up process has completed and to determine an elapsed time of the start-up process based on the read voltage across the capacitor.

In accordance with other aspects of the disclosed concept, a method of determining an elapsed time of a start-up process of an electronic trip unit of a circuit interrupter comprises: providing a timing circuit including a capacitor structured to begin charging when the electronic trip unit begins to receive power; performing a start-up process of the processor when the electronic trip unit begins to receive power; reading a voltage across the capacitor when the start-up process has completed; and determining an elapsed time of the start-up process based on the read voltage across the capacitor.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
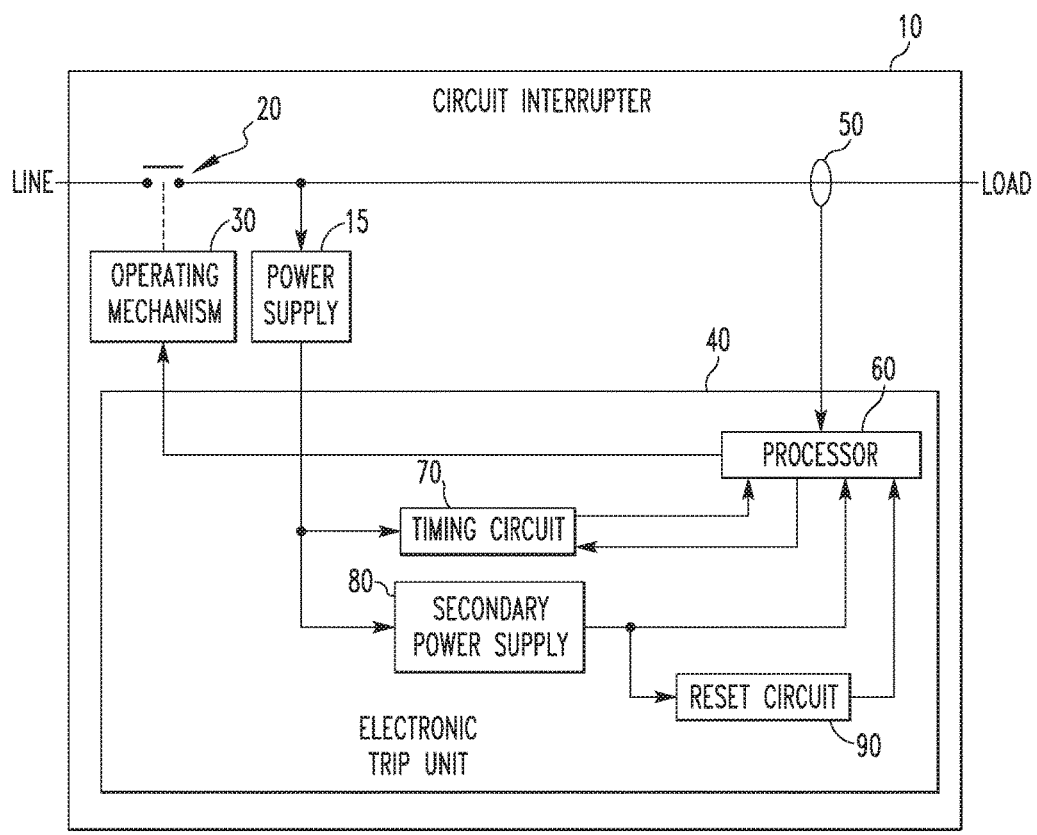
FIG. 1 is a block diagram in schematic form of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

FIG. 1 is a block diagram in schematic form of a circuit interrupter 10 (e.g., without limitation, a circuit breaker) in accordance with an example embodiment of the disclosed concept. The circuit interrupter 10 is electrically connected on a protected circuit between a power source (not shown) and a load (not shown). The circuit interrupter 10 receives power from the power source via a LINE input and provides it to the load via a LOAD output.

The circuit interrupter 10 includes separable contacts 20 that are structured to open and close. Opening the separable contacts 20 opens the circuit; i.e., stops current from flowing from the power source to the load. The circuit interrupter 10 also includes an operating mechanism 30. The operating mechanism 30 is structured to trip, i.e., open the separable contacts 20. The operating mechanism 30 may include, for example and without limitation, a solenoid which, when actuated, causes the operating mechanism 30 to trip open the separable contacts 20.

The circuit interrupter 10 also includes an electronic trip unit 40. The electronic trip unit 40 is structured to receive inputs from one or more sensors (e.g., without limitation, a current sensor 50) and to detect a fault (e.g., without limitation, overcurrent, ground fault, arc fault, etc.) with the protected circuit. In response to detecting the fault, the electronic trip unit 40 is structured to output a trip signal to the operating mechanism 30 which causes the operating mechanism 30 to trip open the separable contacts.

The electronic trip unit 40 includes a processor 60, a timing circuit 70, a secondary power supply 80, and a reset circuit 90, which will be described in more detail with respect to FIG. 2. The electronic trip unit 40 has a start-up process that begins when the electronic trip unit 40 begins receiving power from the power supply 15. The start-process includes any delays or processes that need to be completed before the electronic trip unit 40 can begin detecting faults. For example and without limitation, the start-up process of the electronic trip unit 40 may include, a delay associated with the secondary power supply 80 generating a stable voltage, a delay until initialization of the processor 60 is complete, a delay until clocks used by the processor 60 become available, and any other delays or processes that must be completed before the electronic trip unit 40 can begin detecting faults.

The circuit interrupter 10 further includes a power supply 15. The power supply 15 is structured to use power received at the LOAD input to power components of the circuit interrupter 10 such as the electronic trip unit 40. When no power is provided at the LOAD input, the power supply 15 does not provide power to the components of the circuit interrupter 10 and the electronic trip unit 40 will become inoperative.

Figure 2:
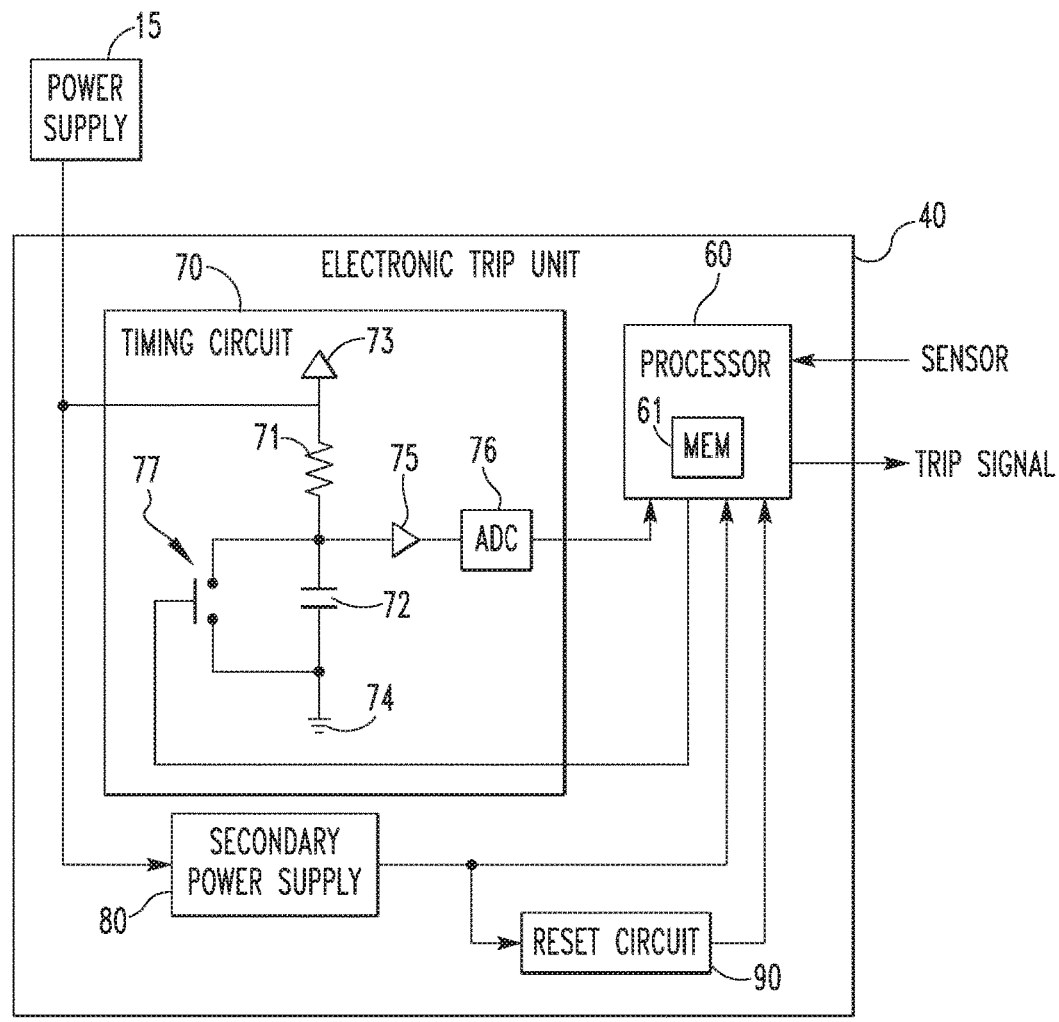
FIG. 2 is a block diagram in schematic form of an electronic trip unit in accordance with an example embodiment of the disclosed concept.

FIG. 2 is a block diagram in schematic form of the processor 60 and timing circuit 70 included in the electronic trip unit 40 of FIG. 1 in accordance with an example embodiment of the disclosed concept. The electronic trip unit 40 includes the processor 60, the timing circuit 70, a secondary power supply 80 (e.g., without limitation, a DC/DC converter), and a reset circuit 90. The processor 60 may include an associated memory 61.

The secondary power supply 80 is structured to receive power from the power supply 15 and to use the power to generate a voltage usable by the processor 60. The voltage must become stable before it can be used by the processor 60 and there is a delay between when the electronic trip unit 40 begins receiving power from the power supply 15 and the voltage generated by the secondary power supply 80 becomes stable. The delay is part of the time included in the start-up process of the electronic trip unit 40. The reset circuit 90 is structured to hold the processor 60 in a reset state until the voltage generated by the secondary power supply 80 becomes stable. Once the voltage becomes stable, the reset is released and the processor 60 may begin executing its initialization programming. In some example embodiments of the disclosed concept, the reset circuit 90 may be integrated into the processor 60.

The processor 60 may be, for example and without limitation, a microprocessor, a microcontroller, or some other suitable processing device or circuitry. The memory 61 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. In some embodiments of the disclosed concept, one or more subroutines that may be executed by the processor 60 may be stored in the memory 61. In some example embodiments of the disclosed concept, the memory 61 is included with the processor 60. However, it will be appreciated by those having ordinary skill in the art that the memory 61 may be separate from the processor 60.

The processor 60 is structured to receive inputs from one or more sensors, detect a fault based on the inputs from the sensors, and to output a trip signal in response to detecting the fault. For many types of faults, the processor 60 delays outputting the trip signal based on the magnitude of the current and user settings. The user settings, in conjunction with the circuit-protection programming within the processor 60, basically define the characteristics of the tripping function, which are documented by trip curves associated with the circuit interrupter 10. The user settings may be stored in memory 61. For example, if there is an overcurrent fault, the processor 60 may delay outputting the trip signal a predetermined amount of time based on the user setting, as shown in the associated trip curve.

Powering on and initializing the processor 60 (in addition to waiting for the secondary power supply 80 to provide a stable voltage and the reset circuit 90 to release the reset of the processor 60) is part of the start-up process of the electronic trip unit 40. The processor 60 is not able to begin detecting faults until the start-up process of the electronic trip unit 40 has completed. The start-up process takes time and if a fault is present while the start-up process of the electronic trip unit 40 is occurring, that time should be taken into account when determining when to output the trip signal. The processor 60 takes the time to proceed through the start-up process into account, as will be described hereinafter.

The electronic trip unit 40 includes the timing circuit 70 which is used to sense the amount of time it takes to go through the start-up process. The timing circuit 70 includes a resistor 71 and a capacitor 72 electrically coupled between a voltage source 73 and ground 74. Voltage for the voltage source 73 is provided by the power supply 15. The power supply 15 begins providing voltage for the voltage source 73 when the circuit interrupter 10 begins receiving power at the LOAD input. Also, when the electronic trip unit 40 begins receiving power from the power supply 15, the electronic trip unit 40 begins the start-up process.

While the electronic trip unit 40 proceeds through the start-up process, the capacitor 72 is being charged by the voltage source 73. As the capacitor 72 charges, the voltage across the capacitor 72 increases. Once the electronic trip unit 40 has completed the start-up process, the processor 60 reads the voltage across the capacitor 72. The timing circuit 70 includes a buffer 75 and an analog to digital converter (ADC) 76 electrically connected between the capacitor 72 and the processor 60. The buffer 75 isolates the capacitor 72 from the processor 60 and the ADC 76 converts the voltage across the capacitor 72 into a digital form so that it can be read by the processor 60. In some example embodiments of the disclosed concept, the ADC 76 may be included in the processor 60.

Additionally, after the processor 60 reads the voltage across the capacitor 72, the processor 60 causes the capacitor 72 to discharge. The timing circuit 70 includes a discharge switch 77 electrically connected across the capacitor 72. The processor 60 is structured to control the discharge switch 77 to open and close. In its reset state, the discharge switch 77 is open, which allows the capacitor 72 to charge via the voltage source 73. When the processor 60 completes its start-up process and has read the voltage across the capacitor 72, the processor 60 controls the discharge switch 77 to close, which allows the capacitor 72 to discharge. This ensures that the capacitor always begins to charge from a completely discharged state when measuring the start-up process.

The voltage across the capacitor 72 that is read by the processor 60 is proportional to the amount of time it takes to complete the start-up process. The relation between the voltage across the capacitor 72 and elapsed time may be stored in memory 61. In some example embodiments of the disclosed concept, the relation between the voltage across the capacitor 72 and elapsed time may be determined using a calibration process, an example of which will be described in more detail with respect to FIG. 5. Using the voltage across the capacitor 72 and the relation between the voltage across capacitor 72 and the elapsed time, the processor 60 determines the elapsed time of the start-up process.

In some example embodiments of the disclosed concept, processor 60 updates its trip times based on the elapsed time of the start-up process. For example, when a fault is immediately present when the breaker closes, the processor 60 will update its trip times to account for the elapsed time of the start-up process. In the situation where the trip curve indicates a delay time (e.g., without limitation, 100 milliseconds) from detecting the fault to outputting the trip signal based on the characteristics of the fault, the processor 60 will update the trip time by subtracting the elapsed time of the start-up process from the delay time. As such, in the case where a fault is present when the circuit interrupter 10 receives power, the circuit interrupter 10 will trip more precisely in accordance with the time indicated in the trip curve. In contrast, circuit interrupters that do not account for the elapsed time of the start-up process will have an unaccounted for period of time and will not be able to trip precisely in accordance with the trip curve.

In addition, the start-up process may vary from unit to unit. The start-up process may also vary within the same unit with aging due to the tolerance of the components in the electronic trip unit 40. Different steps taken in the initialization process of the processor 60 may also cause the start-up process to vary. Approximating the elapsed time of the start-up process using a fixed time can be inaccurate. The circuit interrupter 10 including the timing circuit 70 in accordance with example embodiments of the disclosed concept, provides a more accurate measurement of the elapsed time of the start-up process of the electronic trip unit 40.

Figure 3:
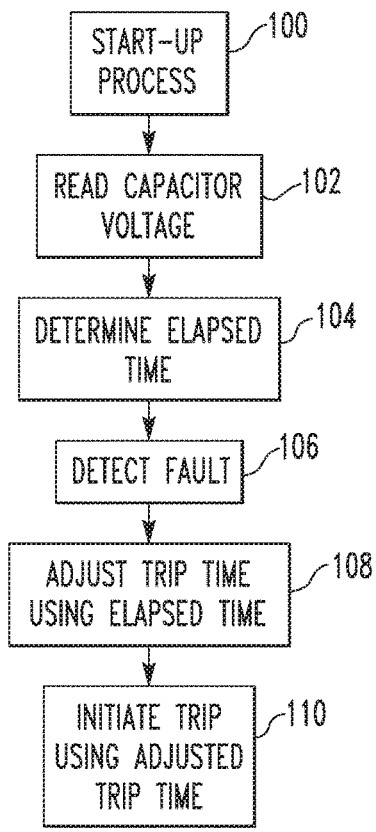
FIG. 3 is a flowchart of a method of compensating for the start-up time when determining the trip time in accordance with an example embodiment of the disclosed concept.

FIG. 3 is a flowchart of a method of adjusting for the elapsed time of the start-up process of the electronic trip unit 40 in accordance with an example embodiment of the disclosed concept. The method of FIG. 3 may be implemented, for example, by the electronic trip unit 40 of FIG. 1 or 2. For example, the method of FIG. 3 may be a subroutine executable by processor 60 and stored in memory 61. The method of FIG. 3 is implemented when a fault condition is immediately present when power begins flowing through the circuit interrupter 10 (e.g., a fault condition is present as soon as the separable contacts 20 are closed).

Before starting the method of FIG. 3, the electronic trip unit 40 is inoperative and is not receiving power from the power supply 15. The method of FIG. 3 is initiated when the electronic trip unit 40 begins receiving power from the power supply 15. At 100 the start-up process begins. The processor 60 is held in reset by the reset circuit 90, and the secondary power supply 80 begins to generate a voltage usable by the processor 60. The start-up process includes the time from beginning to receive power to beginning to sense for faults. The start-up process includes the processor 60 powering on and initializing. An example of the start-up process will be described in more detail with respect to FIG. 4. Once the start-up process completes, the method proceeds to 102 where the processor 60 reads voltage across the capacitor 72. As previously described, the capacitor 72 begins charging when the power supply 15 begins providing power to the electronic trip unit 40.

The voltage across the capacitor is proportional to the elapsed time of the start-up process. At 104, the processor 60 determines the elapsed time of the start-up process. The relation between the elapsed time of the start-up process and the voltage across the capacitor 72 may be stored in memory 61. In some example embodiments of the disclosed concept, the relation may be determined by a calibration process, an example of which will be described in more detail with respect to FIG. 5.

Once the elapsed time of the start-up process has been determined, the processor 60 detects a fault at 106. As previously noted, in the example embodiment of FIG. 3, a fault is immediately present when power begins flowing through the circuit interrupter 10. However, the fault is not immediately detected by the electronic trip unit 40 due to the elapsed time of the start-up process. At 108, the trip time corresponding to the detected fault is adjusted. For example, the elapsed time of the start-up process is subtracted from the delay time indicated by the trip curve. At 110, the processor 60 initiates a trip (e.g., outputs a trip signal) based on the adjusted trip time. Since the adjusted trip time has been adjusted based on the elapsed time of the start-up process of the processor 60, the actual time that the circuit interrupter 10 trips in response to the detected fault will be more precisely in accordance with the trip curve.

Figure 4:
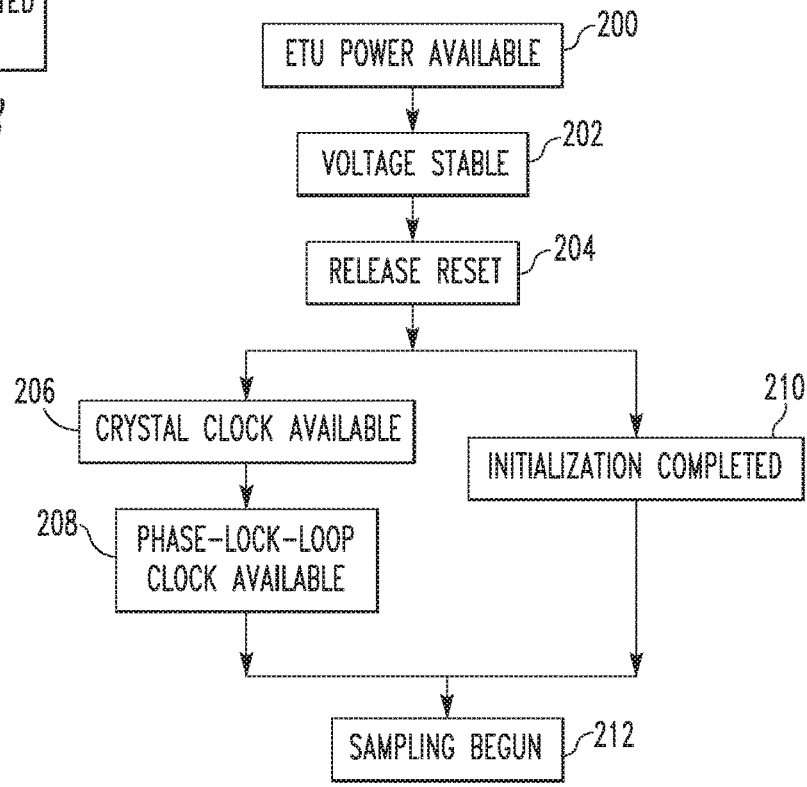
FIG. 4 is a flowchart of a start-up process in accordance with an example embodiment of the disclosed concept.

FIG. 4 is a flowchart of a start-up process of a processor in accordance with an example embodiment of the disclosed concept. The start-up process of FIG. 4 may be implemented, for example, in the processor 60 of FIG. 2.

The start-up process begins at 200 when power becomes available to the electronic trip unit 40. For example, power may become available to the electronic trip unit 40 when power begins flowing through the circuit interrupter 10 and the power supply 15 begins providing power to the electronic trip unit 40. The secondary power supply 80 then generates and provides a voltage usable to the processor 60 at 202. The reset circuit 90 holds the processor 60 in a reset state until the voltage is stable, and the reset is released at 204. Releasing the reset causes the processor 60 to begin executing its initialization code. Clock signals will also begin to become available to the processor 60 after the internal reset is released.

At 206, an external crystal clock frequency becomes available to the processor 60. The external crystal clock frequency is more accurate and stable than an internal clock oscillator of the processor 60. The processor 60 uses the external crystal clock frequency to generate a high-speed phase-lock-loop (PLL) clock. Once the PLL clock has been generated, it becomes available at 208. While the external crystal clock frequency and the PLL clock are becoming available, the processor 60 runs its initialization code until initialization is completed at 210.

In order to begin detecting faults, 208 and 210 must be completed so that the PLL clock is available and initialization is complete. Once 208 and 210 are completed, the method proceeds to 212 and the processor 60 begins sampling inputs from the sensors it receives inputs from. In addition, the processor 60 reads the start-up time as described earlier. Once the processor 60 begins sampling, it is able to begin detecting faults. FIG. 4 illustrates a flowchart of one example of a start-up process. One having ordinary skill in the art will appreciate that many variations of the start-up process are possible without departing from the scope of the disclosed concept.

Figure 5:
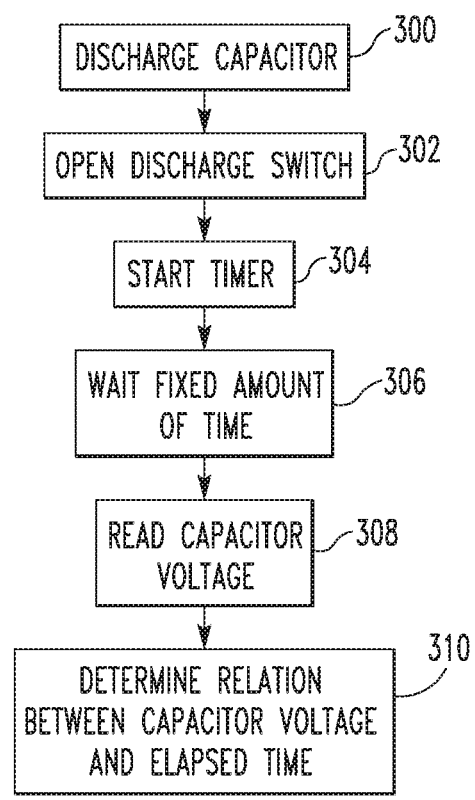
FIG. 5 is a flowchart of a method of calibrating a timing circuit in accordance with an example embodiment of the disclosed concept.

FIG. 5 is a flowchart of a method of calibrating the timing circuit 70 in accordance with an example embodiment of the disclosed concept. The method of FIG. 5 may be implemented, for example, by the electronic trip unit 40 of FIG. 1 or 2. For example, the method of FIG. 5 may be a routine executable by processor 60 and stored in memory 61. The method of FIG. 5 is implemented when the electronic trip unit 40 is operative.

The method of FIG. 5 begins at 300 with discharging the capacitor 72. For example, the processor 60 may control the discharge switch 77 to close in order to discharge the capacitor 72. The processor 60 may also confirm that the capacitor 72 has discharged by reading the voltage across the capacitor 72. Once the capacitor 72 has discharged, the method proceeds to 302 where the processor 60 opens the discharge switch 77. Opening the discharge switch 77 allows the capacitor 72 to begin charging via the voltage source 73.

Once the discharge switch 77 has been opened, the processor 60 waits a fixed amount of time. In some example embodiments of the disclosed concept, the fixed amount of time is a time that is selected to be less than the amount of time it would take the capacitor 72 to charge to its capacity. After waiting the fixed amount of time, the processor 60 reads the voltage across the capacitor 72 at 308. Subsequently, the processor 60 determines the relation between the voltage across the capacitor 72 and an elapsed amount of time at 310.

The capacitor 72 in the timing circuit 70 charges according to the equation:

$$V_C = V_s[1 - e^{-\frac{t}{RC}}]$$

where $V_C$ is the voltage across the capacitor 72, $V_s$ is the voltage of the voltage source 73, C is the capacitance of the capacitor 72, R is the resistance of the resistor 71, and t is the amount of time the capacitor 72 has been charging. Further manipulation of the equation yields:

$$RC = t \bigg/ \left[\ln\left[1 - \frac{V_C}{V_S}\right]\right]$$

This equation allows the processor 60 to calibrate for tolerance, temperature, and aging effects in capacitor 72 and resistor 71. The RC value may be stored in memory 61 and then used in the previous equation to determine the elapsed time of the start-up process.

Small portions of the exponential and natural log functions may be approximated as straight lines, so the designer may use approximations to simplify the equations, depending on the capabilities of the processor 60.

Once the relation between the voltage across the capacitor 72 and the elapsed amount of time has been determined, the relation may be stored in memory 61. The processor 60 may subsequently reference the relation when determining the elapsed time of its start-up process.

As described herein, the circuit interrupter 10 in accordance with example embodiments of the disclosed concept adjusts for the elapsed time of the start-up process of its electronic trip unit 40. The circuit interrupter 10 trips more precisely in accordance with its trip curve when a fault is detected when power begins flowing through the circuit interrupter 10. Prior circuit interrupters have used higher tolerances for their trip curves in part because they cannot adjust for elapsed time of the start-up process. The circuit interrupter 10 in accordance with example embodiments of the disclosed concept is able to have lower tolerances for its trip curves, which is particularly beneficial when designing power distribution systems that utilize coordination between multiple circuit interrupters.

It is contemplated that aspects of the disclosed concept can be embodied as computer readable codes on a tangible computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter electrically connected to a circuit, the circuit interrupter comprising:

separable contacts structured to open to interrupt current flowing through the circuit interrupter;
an operating mechanism structured to trip open the separable contacts;
a power supply structured to use power flowing through the circuit interrupter to provide power to components of the circuit interrupter; and
an electronic trip unit structured to receive power from the power supply and including:
a processor structured to detect faults in the circuit based on inputs from one or more sensors and to cause the operating mechanism to trip open the separable contacts in response to detecting a fault; and
a timing circuit including a capacitor structured to begin charging when the electronic trip unit begins receiving power from the power supply,
wherein the electronic trip unit includes a start-up process and is structured to proceed through the start-up process when the electronic trip unit begins receiving power from the power supply,
wherein the processor is structured to read a voltage across the capacitor when the start-up process has completed and to determine an elapsed time of the start-up process based on the read voltage across the capacitor, and
wherein the circuit interrupter is associated with one or more trip times, wherein the processor is structured to adjust at least one trip time based on the determined elapsed time of the start-up process, and wherein the processor is structured to use the adjusted trip time to determine when to cause the operating mechanism to trip open the separable contacts.

2. The circuit interrupter of claim 1, wherein the electronic trip unit further includes:
a secondary power supply structured to convert power from the power supply into a voltage usable by the processor;
a reset circuit structured to hold the processor in a reset state until the voltage is stable.

3. The circuit interrupter of claim 1, wherein the processor is structured to use the adjusted trip time when the detected fault is detected upon the processor completing the start-up process.

4. The circuit interrupter of claim 1, wherein the processor is structured to determine a relation between elapsed time and the voltage across the capacitor using a calibration process.

5. The circuit interrupter of claim 4, wherein, in the calibration process, the processor is structured to cause the capacitor to discharge, to allow the capacitor to charge for a fixed amount of time, and to read the voltage across the capacitor at an end of the fixed amount of time.

6. The circuit interrupter of claim 1, wherein the timing circuit further includes:
a resistor, wherein the resistor and the capacitor are electrically coupled between a voltage source provided by the power supply and ground.

7. The circuit interrupter of claim 5, wherein the timing circuit further includes:
a buffer electrically coupled between the capacitor and the processor; and
an analog to digital converter electrically connected between the capacitor and the processor,
wherein the analog to digital converter is structured to convert the voltage across the capacitor to a digital value.

8. The circuit interrupter of claim 6, wherein the timing circuit further includes:
a discharge switch electrically connected across the capacitor,
wherein closing the discharge switch causes the capacitor to discharge and opening the discharge switch allows the capacitor to charge, and
wherein the processor is structured to control the discharge switch.

9. The circuit interrupter of claim 1, wherein, in the start-up process, the processor is structured to be released from a reset state.

10. The circuit interrupter of claim 9, wherein, in the start-up process, the processor is structure to wait for a phase-lock-loop clock to become available or to complete execution of initialization code.

11. A method of determining an elapsed time of a start-up process of an electronic trip unit of a circuit interrupter, the method comprising:
providing a timing circuit including a capacitor structured to begin charging when the electronic trip unit begins to receive power;
performing a start-up process of the electronic trip unit when the electronic trip unit begins to receive power;
reading a voltage across the capacitor when the start-up process has completed;
determining an elapsed time of the start-up process based on the read voltage across the capacitors;
adjusting at least one trip time associated with the circuit interrupter based on the determined elapsed time of the start-up process; and
using the adjusted trip time to determine when to output a trip signal.

12. The method of claim 11, wherein the adjusted trip time is used when a fault is detected upon completion of the start-up process.

13. The method of claim 11, further comprising:
determining a relation between elapsed time and the voltage across the capacitor using a calibration process.

14. The method of claim 13, wherein the calibration process comprises:
causing the capacitor to discharge;
allowing the capacitor to charge for a fixed amount of time; and
reading the voltage across the capacitor at an end of the fixed amount of time.

15. The method of claim 11, wherein the timing circuit further includes:
a resistor, wherein the resistor and the capacitor are electrically coupled between a voltage source and a ground.

16. The method of claim 15, wherein the timing circuit further includes:
a buffer electrically coupled to the capacitor; and
an analog to digital converter electrically coupled to the buffer,
wherein the analog to digital converter is structured to convert the voltage across the capacitor to a digital value.

17. The method of claim 15, wherein the timing circuit further includes:
a discharge switch electrically connected across the capacitor,
wherein closing the discharge switch causes the capacitor to discharge and opening the discharge switch allows the capacitor to charge.

18. The method of claim 11, wherein the start-up process includes:
    releasing an internal clock.

19. The method of claim 18, wherein the start-up process includes:
    waiting for a phase-lock-loop clock to become available or completing execution of initialization code.

\* \* \* \* \*